US007021510B2

(12) United States Patent
Ellingson

(10) Patent No.: US 7,021,510 B2
(45) Date of Patent: Apr. 4, 2006

(54) CABLE TRACTION APPARATUS AND METHOD

(76) Inventor: David Irwin Ellingson, 918 S. 8th Ave. West, Newton, IA (US) 50208

( * ) Notice: Subject to any disclaimer, the term of this patent is extended or adjusted under 35 U.S.C. 154(b) by 71 days.

(21) Appl. No.: 10/777,555

(22) Filed: Feb. 12, 2004

(65) Prior Publication Data

US 2005/0179019 A1 Aug. 18, 2005

(51) Int. Cl.
*F16L 1/12* (2006.01)
*B65H 20/00* (2006.01)
*B65H 23/08* (2006.01)

(52) U.S. Cl. ...................... 226/172; 226/190; 226/176; 226/195; 104/178

(58) Field of Classification Search ................ 254/265, 254/266, 333; 226/171, 172, 173, 176, 187, 226/188, 179; 104/173.1, 173.2, 178, 183, 104/229, 202, 226
See application file for complete search history.

(56) References Cited

U.S. PATENT DOCUMENTS 1,759,105 A * 5/1930 Evans ......................... 57/138
2,480,488 A 8/1949 MacClatchie
2,647,694 A 8/1953 Bush
2,742,144 A 4/1956 Meyerbach
3,275,300 A 9/1966 Delacour
3,363,880 A 1/1968 Blagg
3,881,647 A 5/1975 Wolfe
3,946,918 A * 3/1976 Babbin et al. ................. 226/1
4,256,199 A 3/1981 Sellards
4,456,226 A 6/1984 Stumpmeier
4,469,267 A 9/1984 Franchuk
5,009,353 A 4/1991 Alquist
5,082,248 A 1/1992 Harig
5,823,712 A * 10/1998 Kalkman et al. ........... 405/165
6,237,502 B1 * 5/2001 Van Damme ............ 104/173.1
6,439,445 B1 * 8/2002 De Groot et al. ........... 226/172

* cited by examiner

*Primary Examiner*—Kathy Matecki
*Assistant Examiner*—Evan H. Langdon

(57) ABSTRACT

A high force traction apparatus which operates along the cable linear axis with no cable bending. The cable is encircled with links from several looping chain drives. The links have a concave friction surface to match the cable radius. Rollers apply pressure to multiple links thereby providing a high normal force on the cable. The staggered and synchronized links keep the high squeeze force evenly distributed. This allows the traction apparatus to impose a pulling force that approaches the cable tensile limit without cable damage.

13 Claims, 16 Drawing Sheets

CABLE TRACTION APPARATUS AND METHOD

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

This invention relates to the field of high force cable retraction means. Present devices generally utilize spool winding methods. These are limited in the amount of cable that can be retracted (only until the spool is full). Spool winding is also limited in maximum retraction force due to cable damage. The high force retraction causes excessive cable stress from bending and squeezing between the windings on the spool.

Rotating sheaves such as used for elevators cannot provide high force retraction. Elevators overcome this deficiency with counterweights and by utilizing multiple cables.

This invention further relates to a continuous cable pulling device (no limit on pulling length.) U.S. Pat. No. 4,256,199 granted to Sellards shows a serpentine device. This device is limited due to the high bending strains imposed on the cable. U.S. Pat. No. 5,009,353 granted to Alquist shows a continuous loop friction device. This device cannot provide a high normal force needed to achieve high pulling force. U.S. Pat. No. 4,456,226 granted to Stumpmeier shows a piston operated device to provide step action cable retraction. This intermittent motion limits the speed of the traction device and imparts repetitive accelerations on the cable. U.S. Pat. No. 5,082,248 granted to Harig shows a grooved bull wheel device with a continuous looping pressure chain. This apparatus provides continuous cable pulling. With additional pressure chains, the apparatus would also be capable of high pulling force. The disadvantages remaining would include the 360 degree cable bending arc, complexity, risk of the cable coming out of the bull wheel groove, and difficulty in threading cable through the apparatus.

The present invention further relates to gondola movement on a cable. The cable traction apparatus would be the motive force to cause movement of the gondola along the cable. In this configuration, the traction apparatus is affixed to the gondola and the cable is stationary.

SUMMARY OF THE INVENTION

The object of the invention is to provide a continuous and high force cable pulling mechanism. Two key systems are at work to accomplish this objective. The first system is a power linkage that converts rotary engine power to lineal force along the axis of the cable. This power linkage could consist of a group of gears, chain drives, belts, pneumatics, hydraulics or other power devices. A looping chain is used to apply this lineal force in a continuous manner. The second system provides the transfer of this lineal force to the cable. Frictional force is defined as the coefficient of friction times the normal force. The chain to cable coefficient of friction is nominally bounded by the materials used for the chain and cable. A reasonable clean steel to steel surface has a coefficient of friction of about 0.7 and is generally not able to be dramatically increased. A more direct method to dramatically increase the friction force is to increase the normal force. A group of rollers are used to provide the high normal force.

The moving chain links have a concave surface that matches the radius of the cable. This allows the high normal force to be distributed over a larger area. The limiting factor for normal force is to not exceed the stress deformation limit of the cable that is resisting this force. The cable is surrounded with two or more links—thus exerting even pressure completely around the cable. The normal force is applied to the chain links through pressure rollers. The pressure rollers and links are staggered in such a way that the force of the pressure roller is always distributed over a substantial area on the cable. This allows a much higher normal force to be applied without damaging the cable. The rollers are biased with Belleville springs. These springs are adjustable and provide a very high force over a short range of movement.

The invention includes several unique features as part of the mechanism. The multiple chain drives surround the cable. The drive line to bring this power to the chains from a single engine is accomplished in a unique manner. A worm drive pinion is positioned in a manner to allow the cable to run through the center of this pinion. Multiple worm output gears (one for each chain drive) are driven by this worm drive pinion. This gearing method keeps the multiple chain drives synchronized and reduces the number of parts required. The synchronization is required to maintain the staggered links.

The straight line path of the cable through the mechanism allows a smaller diameter pilot cable to freely pass through the device. The mechanism self engages the traction cable when it first contacts the moving chain links.

Further features include methods to maintain the optimum coefficient of friction between the chain links and cable.

- A cleaning surface is brought into contact with the moving chain to remove moisture or oil.
- The drive mechanism is enclosed in a cabinet to limit snow or rain encursion.
- Lip seals are provided at the cable entrance and exit to squeegee water or snow off the cable.
- Heat is added to the cabinet to increase the temperature of the chain links and rollers. This is to aid in melting any ice on the cable and evaporate moisture.

The power linkage for this apparatus could be quite varied in configuration. The key requirements of the power linkage include:

a. providing linear motion to the friction surface that contacts the cable b. keeping the friction surfaces in synchronization Other arrangements of gears, belts and chain drives that accomplish these requirements are readily apparent to one skilled in the art.

Some of the areas that further design engineering work could improve include:

a. the sizing of components for power transfer or force—these could include V-belt section, shaft diameter, etc.

b. the style of components—these could include using a ball bearing rather than a sleeve, or a roller chain rather than a V-belt, etc.

c. methods for providing adjustment—these could include shims or adjustment screws for chain or V-belt length, bearing to shaft length, etc.

d. lubrication methods—these would include grease zerks, bearing oil reservoirs, chain greasing routines, etc.

These are all areas that the improvement would be readily apparent to one skilled in the art and are not integral to the present invention. For that reason, the details are not included in this specification.

REFERENCE NUMERALS OF THE DRAWING-

Figure 1:
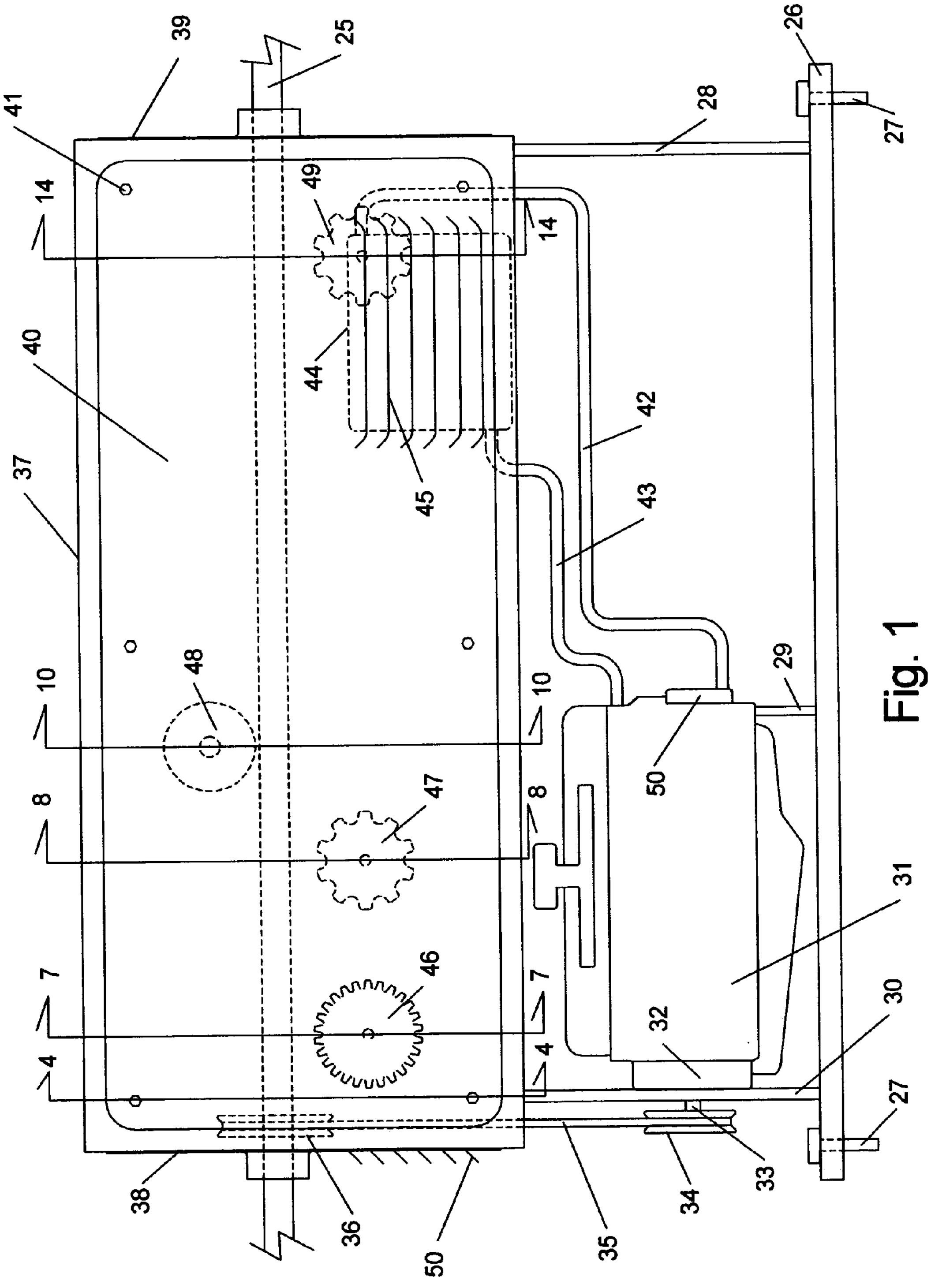
FIG. 1 is a side view of the cable traction apparatus.

| | |
|---|---|
| 25 cable | 26 base |
| 27 anchor bolts | 28 rear support |
| 29 engine rear support | 30 front support |
| 31 engine | 32 transmission/clutch |
| 33 output shaft | 34 engine pulley |
| 35 drive belt | 36 input pulley |
| 37 cabinet | 38 front cover |
| 39 rear cover | 40 side cover |
| 41 screw | 42 outlet hose |
| 43 return hose | 44 radiator |
| 45 louvers | 46 worm output gear |
| 47 chain drive sprocket | 48 pressure roller |
| 49 chain idler sprocket | 50 water pump |
| 51 transfer chain drive sprocket | 52 spacer cylinder |
| 53 support channel A | 54 gear case |
| 55 front axle block | 56 rear axle block |
| 57 drive chain | 58 cleaning block |
| 59 screw | 60 spring bracket |
| 61 bolt | 62 support channel C |
| 63 support channel B | 65 fan motor with shaft |
| 66 fan | 67 transfer chain driven sprocket |
| 68 worm gear shaft | 69 transfer chain |

-continued

REFERENCE NUMERALS OF THE DRAWING-

| | |
|---|---|
| 70 sprocket shaft | 71 worm pinion |
| 72 inner worm gear bearing | 74 worm output seal |
| 75 outer worm gear bearing | 76 cabinet/cable lip seal |
| 77 gear case lip seal | 78 gear case cover lip seal |
| 79 gear case bearing | 80 gear case cover bearing |
| 81 bolt | 82 gear case cover |
| 83 gear case lubricant | 84 inner sprocket shaft bearing |
| 85 outer sprocket shaft bearing | 86 cable link |
| 87 bushing | 88 pin link plate |
| 89 pin | 90 cable link |
| 91 cable link | 92 cable link |
| 93 cable link | 94 pin |
| 95 adjustment screw | 96 collar for roller |
| 97 inner roller bearing | 98 outer roller bearing |
| 99 roller shaft | 100 Belleville spring |
| 101 pressure roller collar | 102 pressure roller collar |
| 103 cable link | 104 cable link |
| 105 cable link | 106 idler sprocket shaft |
| 107 cable idler wheel | 108 idler wheel bracket |
| 109 bolt | 110 cable traction apparatus |
| 111 gondola bracket | 112 gondola |
| 113 console | 114 operator |
| 115 window | 116 door |

DETAILED DESCRIPTION OF THE INVENTION

FIG. 1 shows the side view of the cable traction apparatus. The cable 25 enters and passes through the cable traction apparatus in a straight line. This cable could typically be a steel wire rope such as the AISI (American Iron and Steel Institute) standard 6x27H flattened strand (3 wire center) IWRC (independent wire-rope core) shown in FIG. 15. A cable is frequently mentioned, however the apparatus would provide traction to any reasonably rigid and reasonably constant cross section elongate member. Examples of this could include pipe, hose, dowel, or rope. Other non-circular cross sections would include a box-beam or hex-pipe. For a non-circular cross section, the cable link 86, shown in FIG. 8, would be shaped to match. The elongate member materials could include steel, aluminum, wood, copper and various multi-layer constructions. These shape and material examples are only representative and there are many others.

The base 26 provides support for the various mechanism parts. The anchor bolts 27 affix the base 26 to an immovable object such as earth footings or a building frame. The rear support 28, engine rear support 29 and front support 30 are plate steel members to provide structure support. They are rigidly attached to the base 26.

The engine 31 is an internal combustion device that provides the motive power for the cable traction apparatus. Alternate motive power methods such as an electric, pneumatic or hydraulic motor would be possible. The engine 31 output is directed to the transmission/clutch 32. The transmission/clutch 32 provides speed reduction, reversal, and clutch action to the output shaft 33. The engine pulley 34 is connected to the output shaft 33. The V style belt 35 transfers power from the engine pulley 34 to the input pulley 36.

The cabinet 37 is the main sheet metal enclosure of the apparatus. Additional enclosure parts include the front cover 38, rear cover 39 and side cover 40. All of the covers are attached via screws 41.

Heated coolant is pumped from the engine 31 to the radiator 44 via the pump 50 and outlet hose 42. The coolant exits the radiator 44 and returns to the engine 31 via the return hose 43. The side panel 40 includes a plurality of louvers 45 to facilitate air movement to the radiator 44.

Most of the internal parts in this view have been omitted for clarity. The following are included to provide position and perspective for section views—worm output gear 46, chain drive sprocket 47, pressure roller 48 and chain idler sprocket 49.

Figure 2:
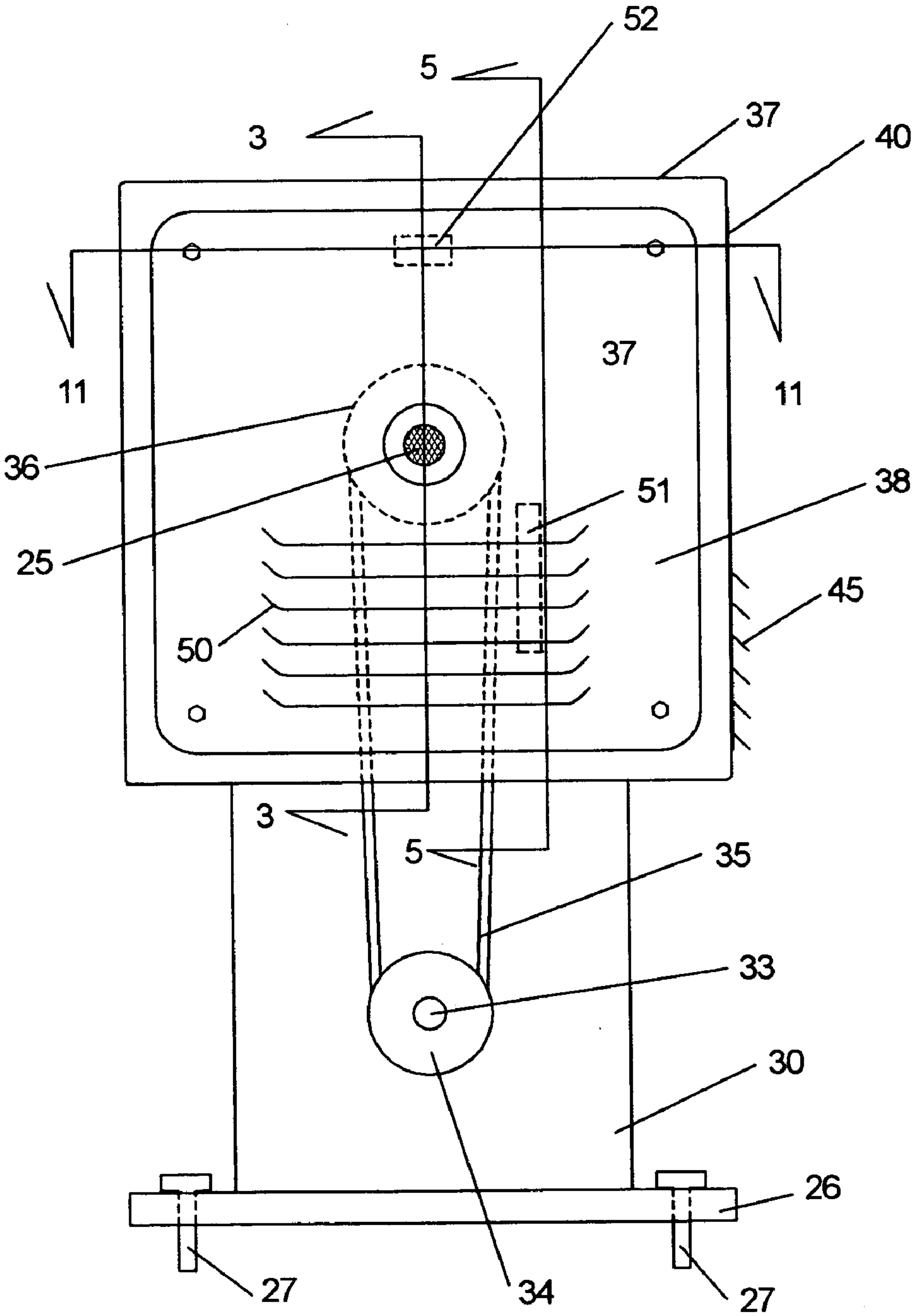
FIG. 2 is a front view of the cable traction apparatus.

FIG. 2 is a front view of the cable traction apparatus. The end view in crosshatch of the cable 25 is shown. This view more clearly shows the relationship of the engine pulley 33, drive belt 35 and input pulley 36. The cable 25 goes through the center of the input pulley 36. There is a clearance between the two parts. Only the input pulley 36 rotates, not the cable 25.

Most of the internal parts in this view have been omitted for clarity. The following are included to provide position and perspective for section views—transfer chain drive sprocket 51 and spacer block 52.

Figure 3:
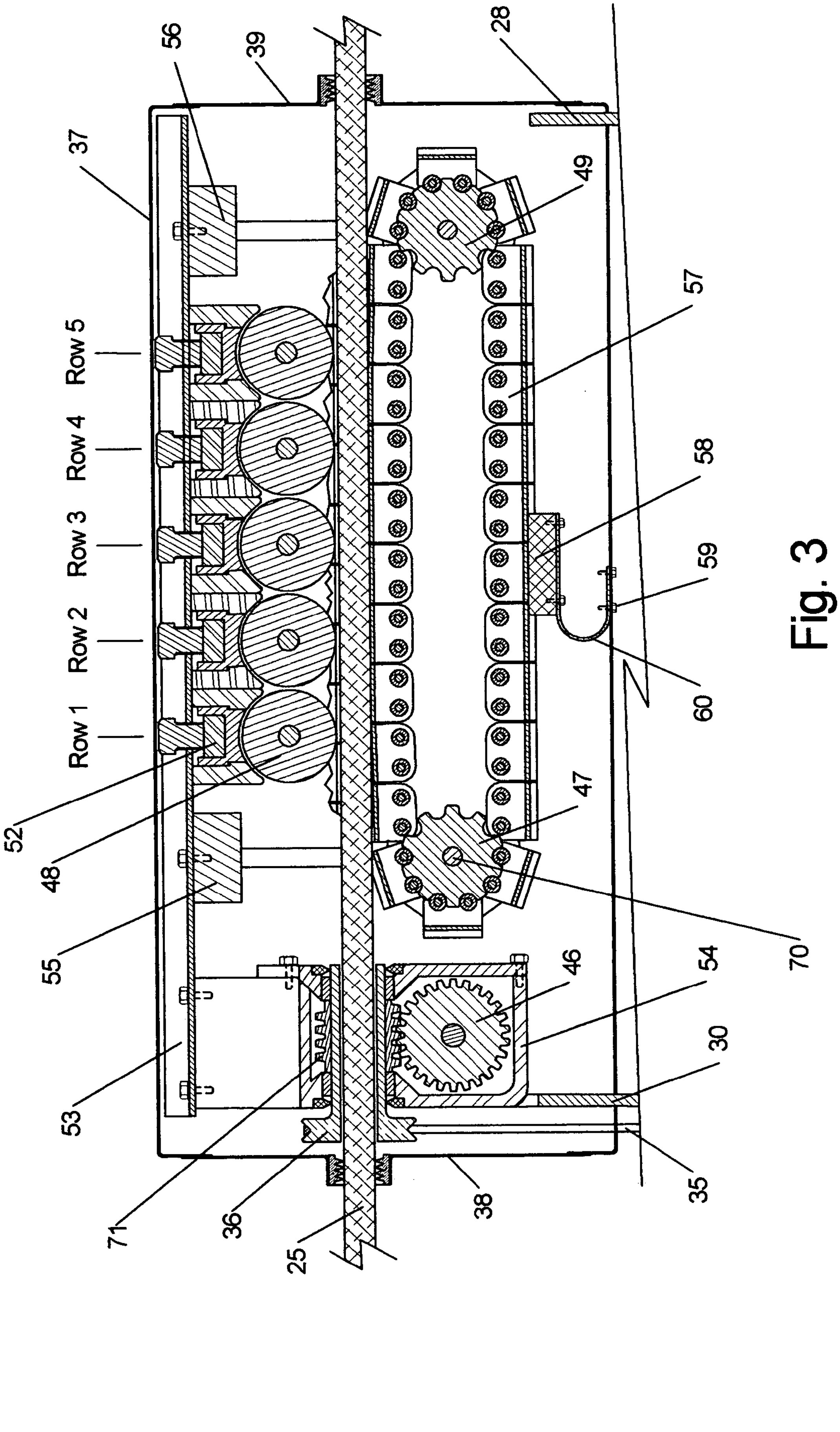
FIG. 3 is a section view through the centerline of the cable traction apparatus—taken along section lines 3—3 from FIG. 2.

FIG. 3 is a section view through the centerline of the cable traction apparatus—taken along section lines 3—3 from FIG. 2. This section view is down the center of the apparatus. The cable 25 can be seen fully sectioned and continuous from one end to the other. The rear support 28 and front support 30 are shown extending into the cabinet 37. For clarity, many of the details behind the section line have been omitted. The internal attachments to the rear support 28 and front support 30 fit this criteria and will be shown in later sections.

The drive belt 35 extends into the cabinet 37 via a cabinet opening that allows belt motion. Support channel A 53, support channel B 63 and support channel C 62 are the main structural elements in the apparatus. Only support channel A 53 is shown in this section view. The gear case 54 houses the worm gear 46.

There are three front axle blocks 55 and three rear axle blocks 56. Only one of each is shown in this section view.

The pressure roller 48 and spacer block 52 in row 1 are identified in this section view. The five rows of pressure rollers are shown.

The chain drive sprocket 47 and chain idler sprocket 49 are shown. They are connected with multiple links of the drive chain 57.

The cleaning block 58 is composed of a flexible porous material and pressed against the drive chain 57. The pressure is caused by the spring bracket 60. The spring bracket 60 is connected to the cleaning block 58 and cabinet 37 via multiple screws 59. The relative motion between the cleaning block 58 and chain drive 57 would remove moisture and grease substances from the chain drive 57. This contaminant removal is desired to maintain a high coefficient of friction between the chain drive 57 and the cable 25. There are three sets of cleaning blocks 58 and spring brackets 60. One for each of the three chain drives 57. Only one is shown in this section view.

The power transmission path of the cable traction apparatus is as follows. Not all of the below components are shown on FIG. 3. Some will be first shown on FIG. 5.

1. The engine 31 output goes through the transmission/clutch 32 to the output shaft 33.
2. The output shaft 33 is connected to the engine pulley 34 that drives the belt 35.
3. The belt 35 rotates the input pulley 36.
4. The input pulley 36 rotates the worm pinion 71.
5. The worm pinion 71 causes rotation of the worm gear 46 and worm gear shaft 68.
6. The worm gear shaft 68 is connected to the transfer chain drive sprocket 51.
7. The transfer chain drive sprocket 51 drives the transfer chain driven sprocket 67 and sprocket shaft 70 via the transfer chain 69.
8. The sprocket shaft 70 is connected to chain drive sprocket 47.
9. The chain drive sprocket 47 drives the drive chain 57 in conjunction with the chain idler sprocket 49.
10. The drive chain 57 contacts the cable 25 and imparts linear motion.

There is one worm pinion 71, but it drives three output axis of approximately identical gear train. Steps 5 thru 10 above are repeated on axis A, axis B and axis C.

Figure 4:
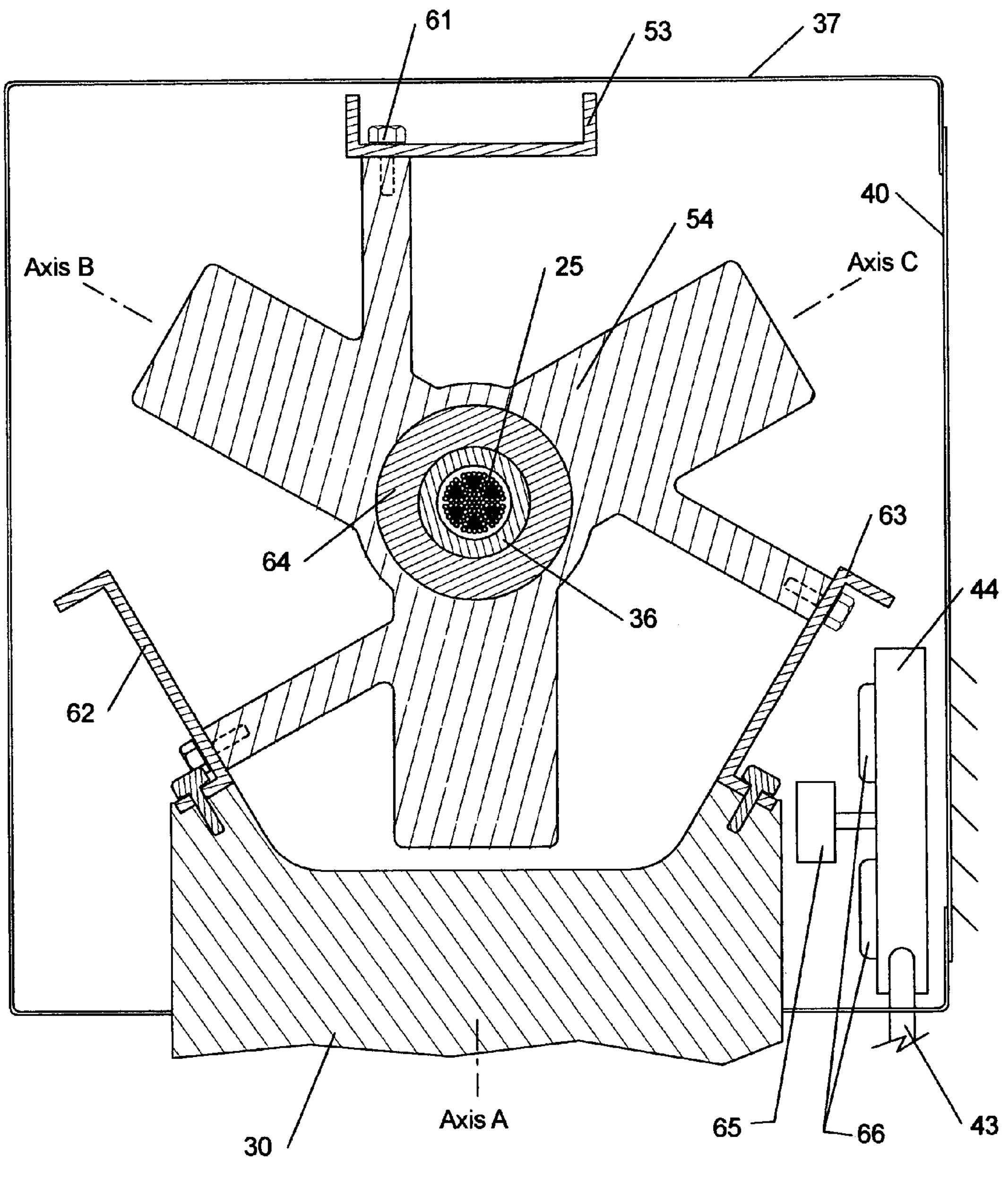
FIG. 4 is a section view through the front wall of the gear case—taken along section lines 4—4 from FIG. 1.

FIG. 4 is a section view through the front wall of the gear case 54—taken along section lines 4—4 from FIG. 1. The gear case 54 is shown fully in cross section because this particular section view is taken through the front wall of the gear case 54. The gear case 54 is a cast part that attaches to support channel A 53, support channel B 63 and support channel C 62 via bolts 61. Support channel B 63 and support channel C 62 also attach to front support 30 via bolts 61.

The cabinet 37 attaches to the three support channels (53, 62, 63) via brackets and screws. These brackets and screws are not shown. The radiator 44, return hose 43, fan motor with shaft 65 and fan 66 are shown. The radiator 44 and fan motor with shaft 65 are attached via brackets and screws to the cabinet 37. These brackets and screws are not shown. In operation, outside air is drawn through louvers 45 and heated at it passes through the radiator 44. The fan motor with shaft 65 is reversible. This allows the air flow to be reversed for warmer outside temperatures. In this situation, no heat would be added to the cabinet 37.

Figure 5:
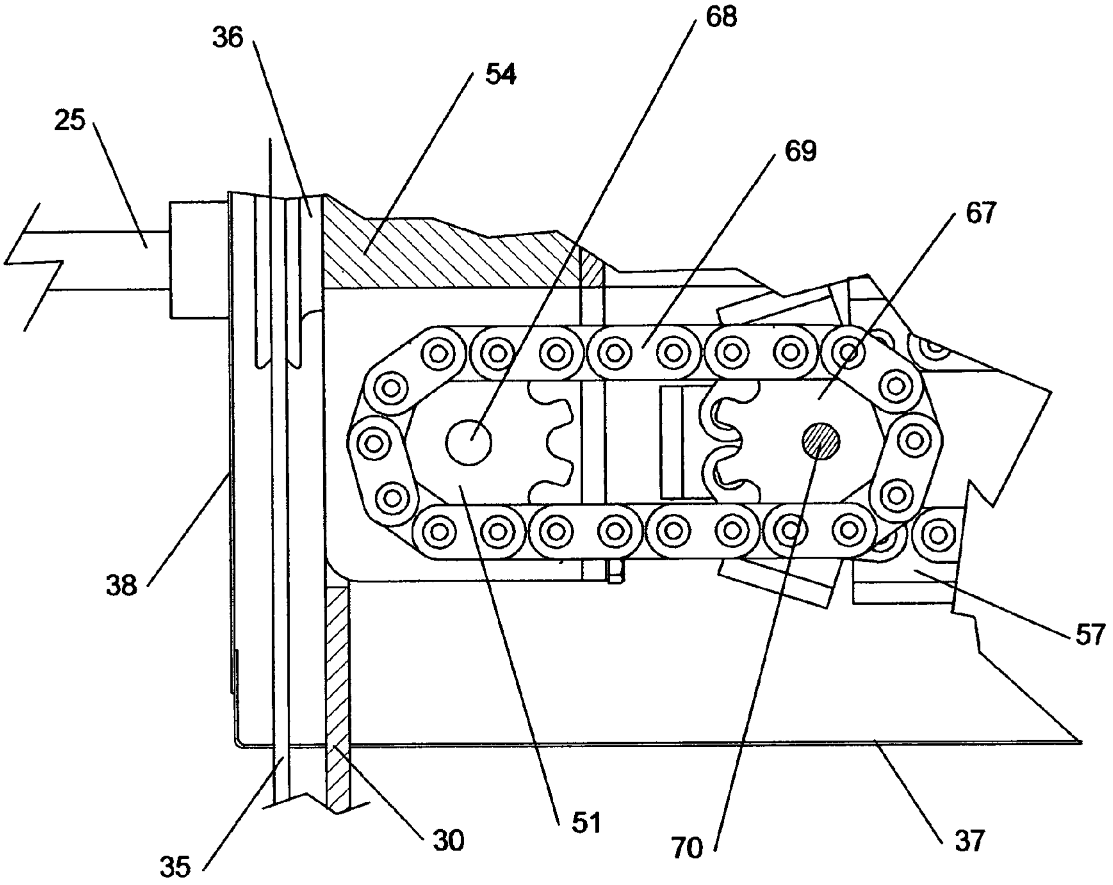
FIG. 5 is a section view of the transfer chain—taken along section lines 5—5 from FIG. 2.

FIG. 5 is a section view of the transfer chain 69—taken along section lines 5—5 from FIG. 2. The worm gear shaft 68 is attached to the transfer chain drive sprocket 51) The rotation of the transfer chain drive sprocket 51 engages the transfer chain 69 and causes rotation of the transfer chain driven sprocket 67. The transfer chain 69 is an ANSI (American National Standards Institute) roller chain. The transfer chain driven sprocket 67 is attached to the sprocket shaft 70. FIG. 5 shows only the axis A transfer chain and related components. Axis B and axis C have similar components.

Figure 6:
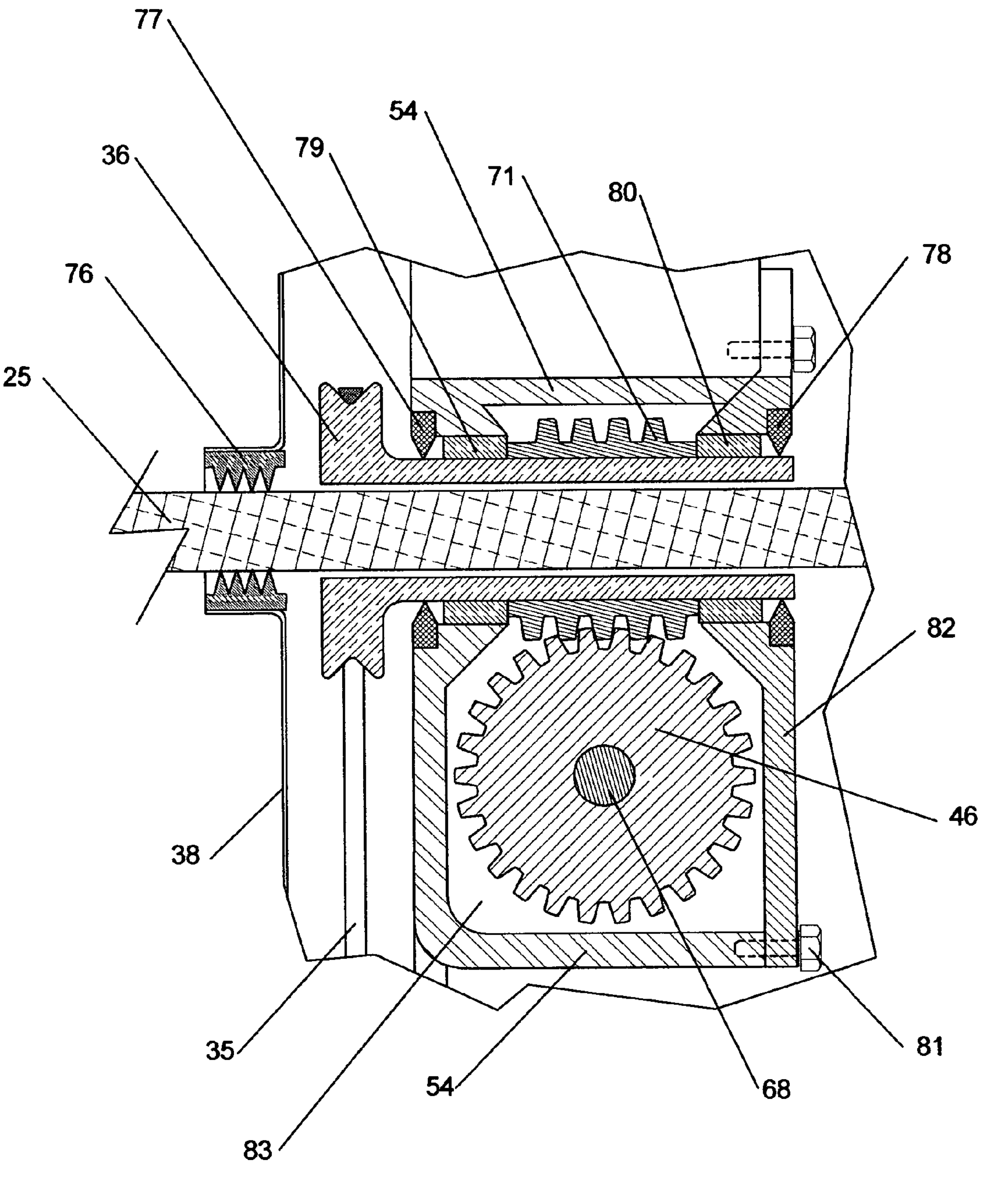
FIG. 6 is an enlargement of the gear case from FIG. 3

FIG. 6 is an enlargement of the gear case 54 from FIG. 3. The cabinet/cable lip seal 76 is shown. This flexible part is press fit to the front cover 38 and slides on the cable 25. The purpose is to limit the entrance of contaminants such as water into the cabinet 37. It also helps remove any adhering contaminant from the cable surface as it passes into the cabinet 37.

The input pulley 36 rotates on the gear case bearing 79 and the gear case cover bearing 80. The clearance between the input pulley 36 and the cable 25 is shown. This clearance is needed to prevent the input pulley 36 rotation from damaging the cable 25. The worm pinion 71 is press fit to the input pulley 36. The gear case cover 82 is attached to the gear case 54 with several bolts 81. The gear case lip seal 77 and gear case cover lip seal 78 are part of the sealed enclosure that is filled with gear case lubricant 83.

The worm pinion 71 engages the worm gear 46 that rotates with the worm gear shaft 68. The worm gear 46 is press fit to the worm gear shaft 68. Worm gearing is standard engineering design. It provides high gear reduction, a 90 degree change in axis of rotation and requires good lubrication due to the sliding contact of the worm teeth. A unique feature of a worm drive is the ability to have one worm pinion engage several worm gears.

Figure 7:
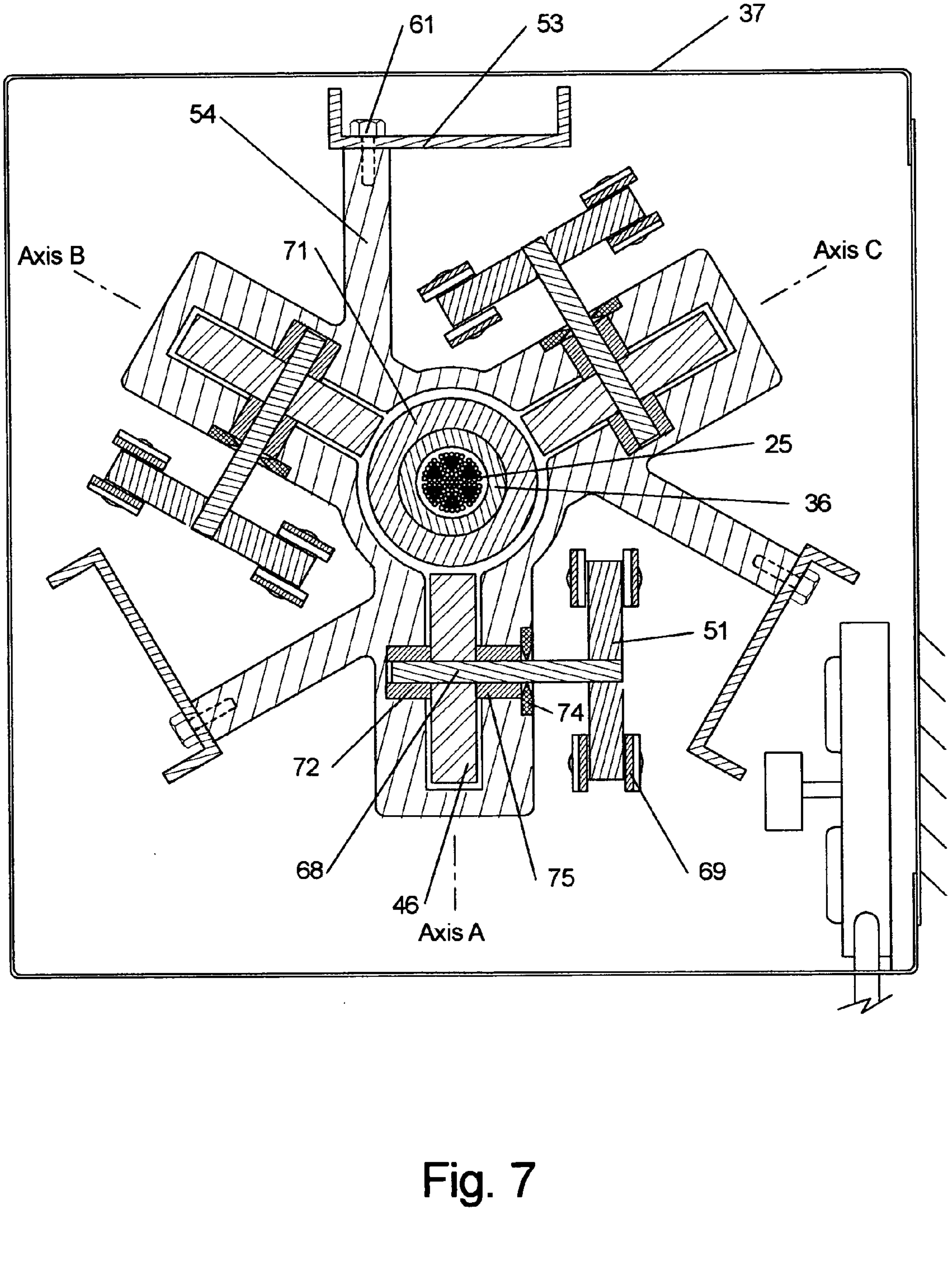
FIG. 7 is a section view of the gear case drive details—taken along section lines 7—7 from FIG. 1.

FIG. 7 is a section view of the gear case 54 drive details—taken along section lines 7—7 from FIG. 1. The worm gear shaft 68 rotates in the inner worm gear bearing 72 and the outer worm gear bearing 75. The worm output seal 74 completes the gear case 54 enclosure seal. This view shows the axis A, axis B and axis C worm gears 46 engaging the worm pinion 71. The clearance as shown in the view is a result of the worm pinion 71 and worm gear 46 tooth geometry in the section plane. As the worm pinion 71 rotates, the three worm gears 46 rotate in a synchronized manner. This synchronization between the three axes will be an important part of the later drive train cable contact.

The transfer chain drive sprocket 51 and transfer chain 69 are also shown. Only the axis A components have been labeled. The axis B and axis C components are identical.

Figure 8:
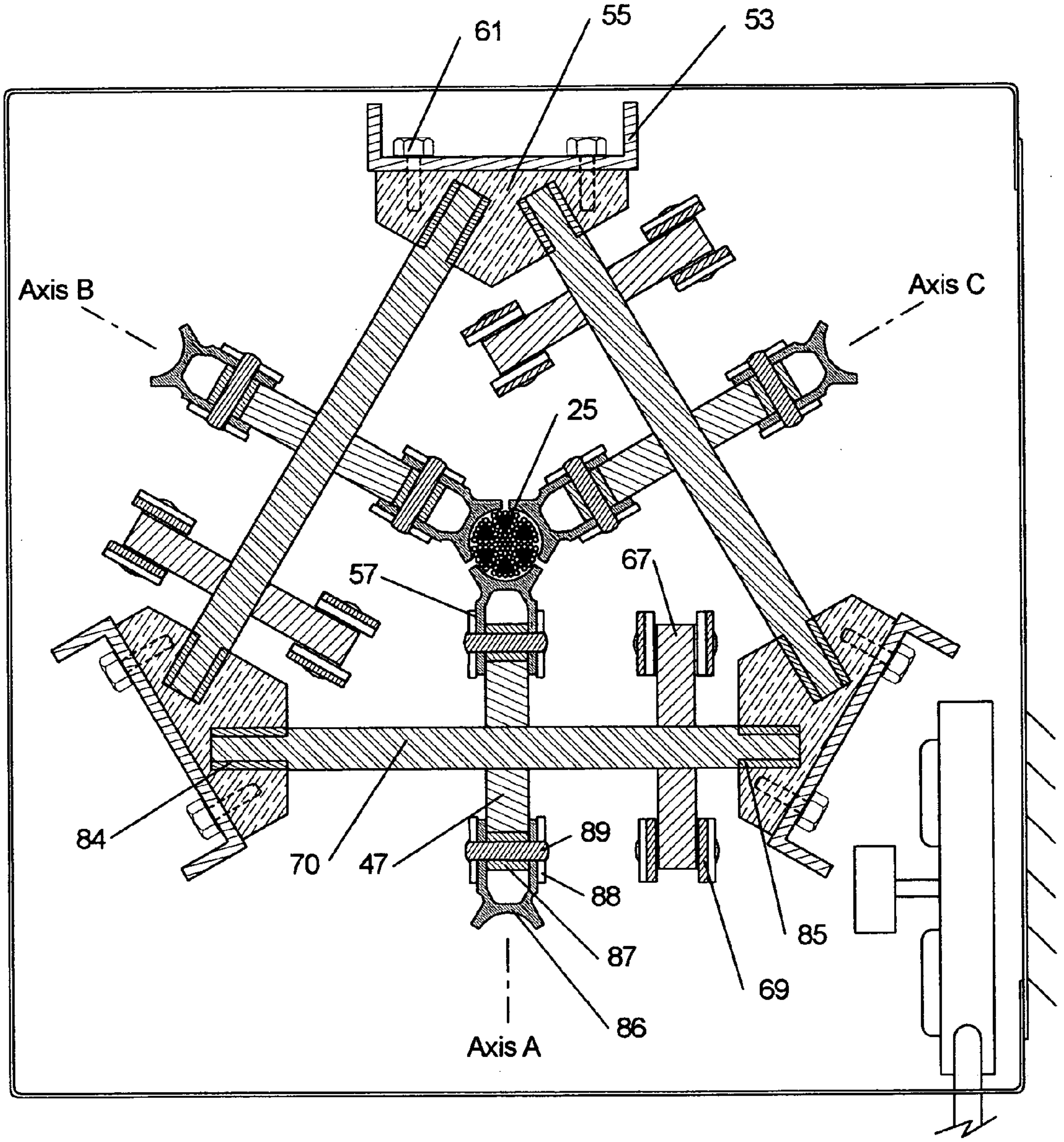
FIG. 8 is a section view of the drive chain details—taken along section lines 8—8 from FIG. 1.

FIG. 8 is a section view of the drive chain 57 details—taken along section lines 8—8 from FIG. 1. The sprocket shaft 70 rotates in the inner sprocket shaft bearing 84 and the outer sprocket shaft bearing 85. The front axle block 55 is attached to support channel A 53 via bolts 61. The transfer chain drive sprocket 67 and the chain drive sprocket 47 are press fit to the sprocket shaft 70. The detail parts of the chain drive 57 are itemized. They include the cable link 86, bushing 87, pin link plate 88 and pin 89. All except the cable link 86 would be ANSI (American National Standards Institute) roller chain parts. The sides of the cable link 86 would be similar to an ANSI roller link part, but the top would be shaped to match the radius of the cable 25. Only the axis A components have been labeled. The axis B and axis C components are identical. Note that there are three separate front axle blocks 55 for the three axes.

The friction surface that contacts the cable 25 is shown as a roller chain cable link 86. The requirements of the friction surface are:

a. wear resistance b. bending strength c. reasonable coefficient of friction against the cable 25 d. properly contoured to match the cable 25 and evenly distribute the pressure load e. have a linear drive action along the cable 25 axis Other friction surface alternatives could include a contoured part attached to a flexible V belt or a wire mesh belt. There are a variety of friction surface materials that meet the above requirements.

Figure 9:
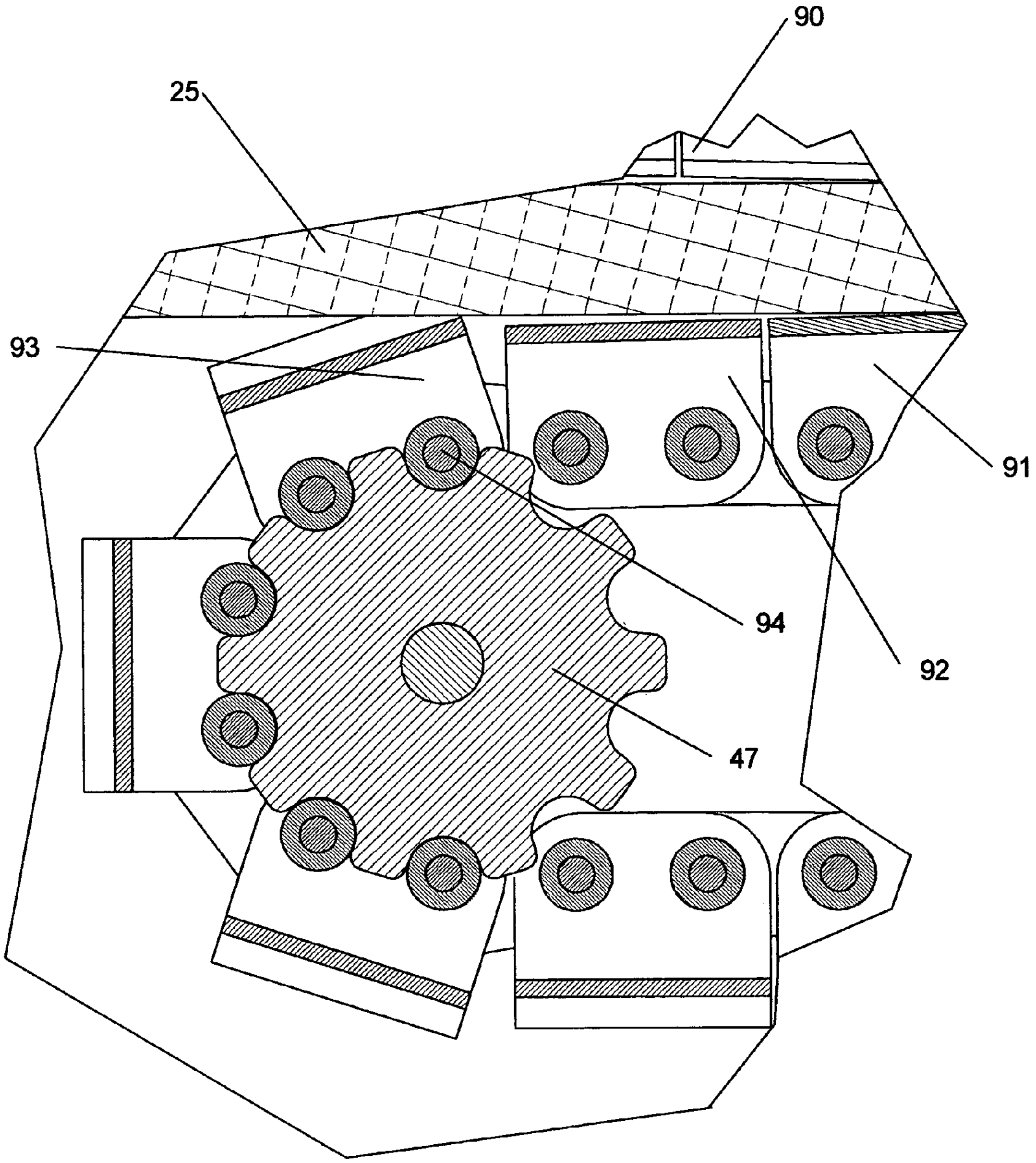
FIG. 9 is an enlargement of the drive chain and chain drive sprocket from FIG. 3

FIG. 9 is an enlargement of the drive chain 57 and chain drive sprocket 47 from FIG. 3. The centerline distance from the sprocket shaft 70 to the cable 25 is slightly larger that the chain drive sprocket 47 radius plus the cable radius 25 plus the cable link 92 height. Note that as the corner of cable link 93 pivots about pin 94, it moves toward the cable 25. This extra pivot clearance must be added to the centerline distance mentioned. Without this extra clearance, the cable links would rapidly damage the cable 25 with dents. The pressure rollers 48 cause the cable links to be pulled out of their straight line motion between the sprockets (47 and 49) and pushed into the cable 25. The cable links now have the proper contact with the cable 25 during the linear motion and the extra clearance needed when the angular motion around the chain drive sprocket 47 commences.

Several cable links are mentioned with different reference numbers. These links are identical in shape but in different positions in the mechanism. A specific reference number is used to clarify a link in a particular position.

Figure 10:
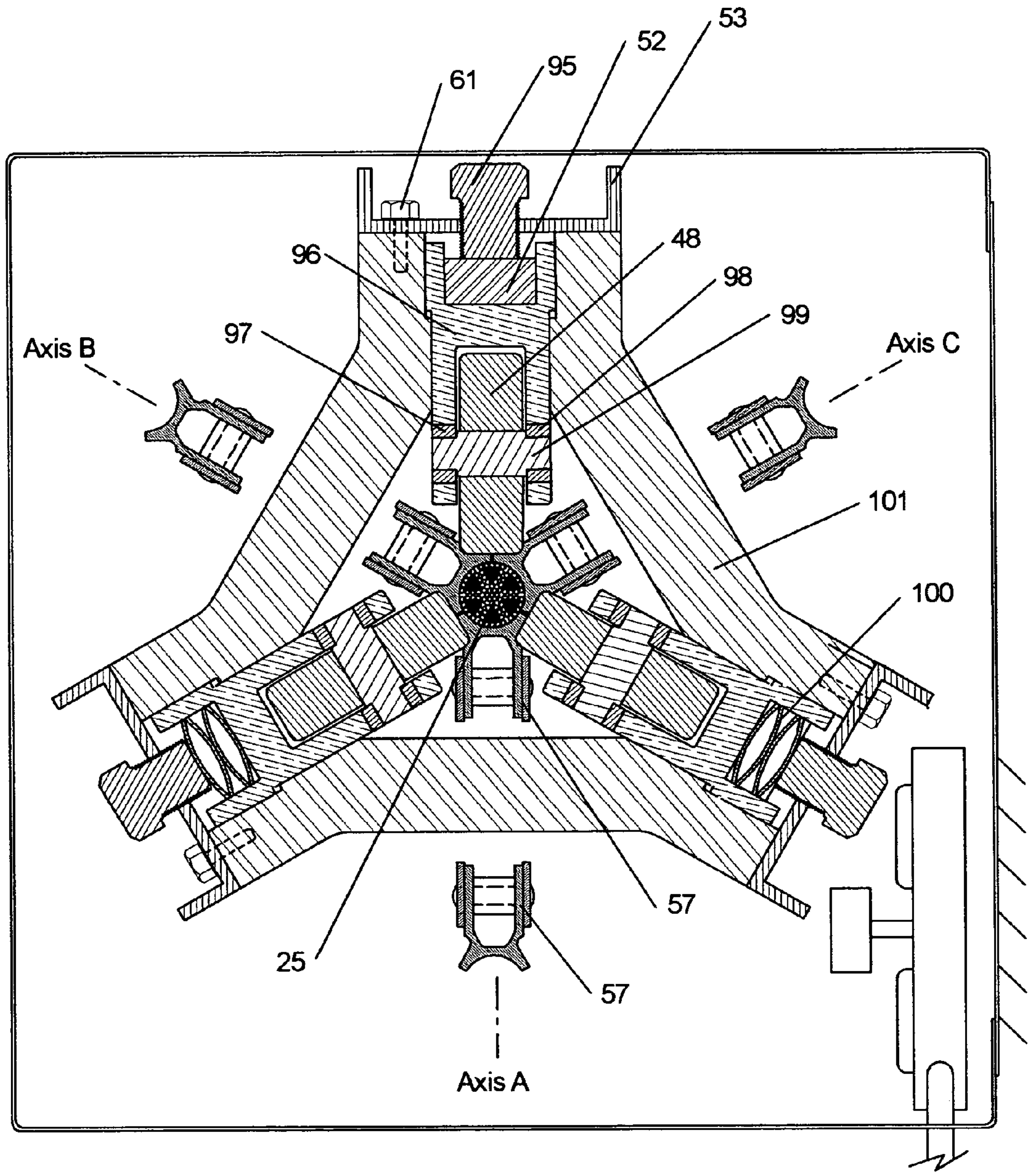
FIG. 10 is a section view of the pressure roller—taken along section lines 10—10 from FIG.

FIG. 10 is a section view of the pressure roller 48—taken along section lines 10—10 from FIG. 1. Note from FIG. 3 that there are five rows of identical pressure rollers 48. Section lines 10—10 were taken through row 1, however the section is applicable to any of the five rows.

The pressure roller collar 101 is attached to support channel A with bolt 61. Support channel A 53 has a tapped hole that matches the thread on adjustment screw 95. The adjustment screw 95 pushes on the spacer cylinder 52 that pushes on the collar for roller 96. The inner roller bearing 97 and outer roller bearing 98 are press fit to the collar for roller 96. The pressure roller 48 is press fit to the roller shaft 99 that is free to rotate in the inner roller bearing 97 and outer roller bearing 98.

The collar for roller 96 slides (up and down as shown for axis A) in a pocket in the pressure roller collar 101. Rotation of the adjustment screw 95 causes the pressure roller 48 to move closer or further from the cable 25. The axis A adjustment with the cylinder block 52 is used to center the cable 25 and cable links.

The axis B and axis C components would be identical with one exception. Axis B and axis C utilize a group of Belleville springs 100 rather than the cylinder block 52. Belleville springs are a standard engineering device which exert a high increasing force over a small distance. Only the increasing force action of the Belleville spring would be used, not the snap type action. The Axis B and axis C adjustment screws 95 are used to cause the correct spring force to be applied from the pressure rollers 48 to the cable links.

Note that there is one pressure roller collar 101 for each pressure row. The pressure roller collar 101 is a structural member that contains the reaction forces of the pressure rollers 48 in a row (such as Row 1.) The pressure roller collar 101 could be of one piece construction or several rigidly attached pieces.

Figure 11:
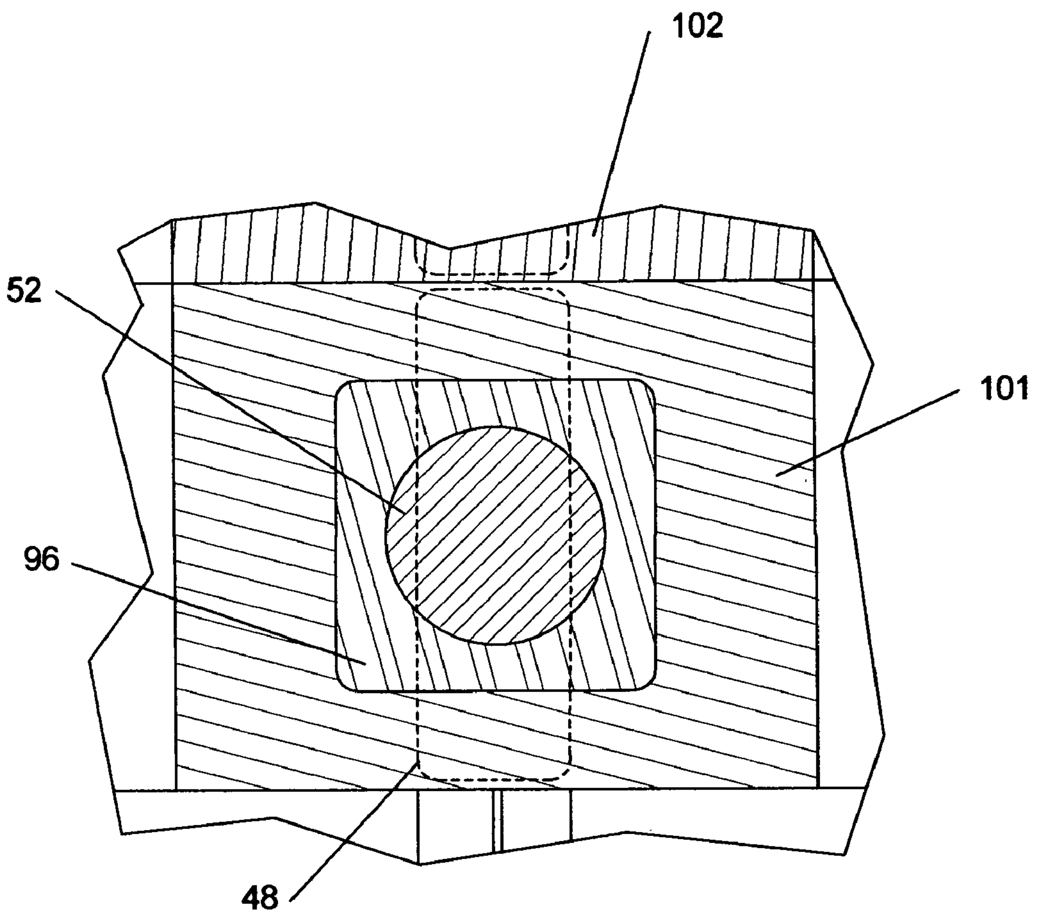
FIG. 11 is a section view of the pressure roller collar—taken along section lines 11—11 from FIG. 2.

FIG. 11 is a section view of the pressure roller collar 102—taken along section lines 11—11 from FIG. 2. Pressure roller collar 101 is from Row 1. Pressure roller collar 102 is from Row 2. The rows are shown in FIG. 3. Note that the collar for roller 96 is constrained from all motion except for the one direction as described for FIG. 10. This is critical in keeping the pressure roller 48 properly aligned with the cable links. The only motion of the collar for roller 96 is as allowed by the adjustment screw 95 or Belleville springs 100.

Figure 12:
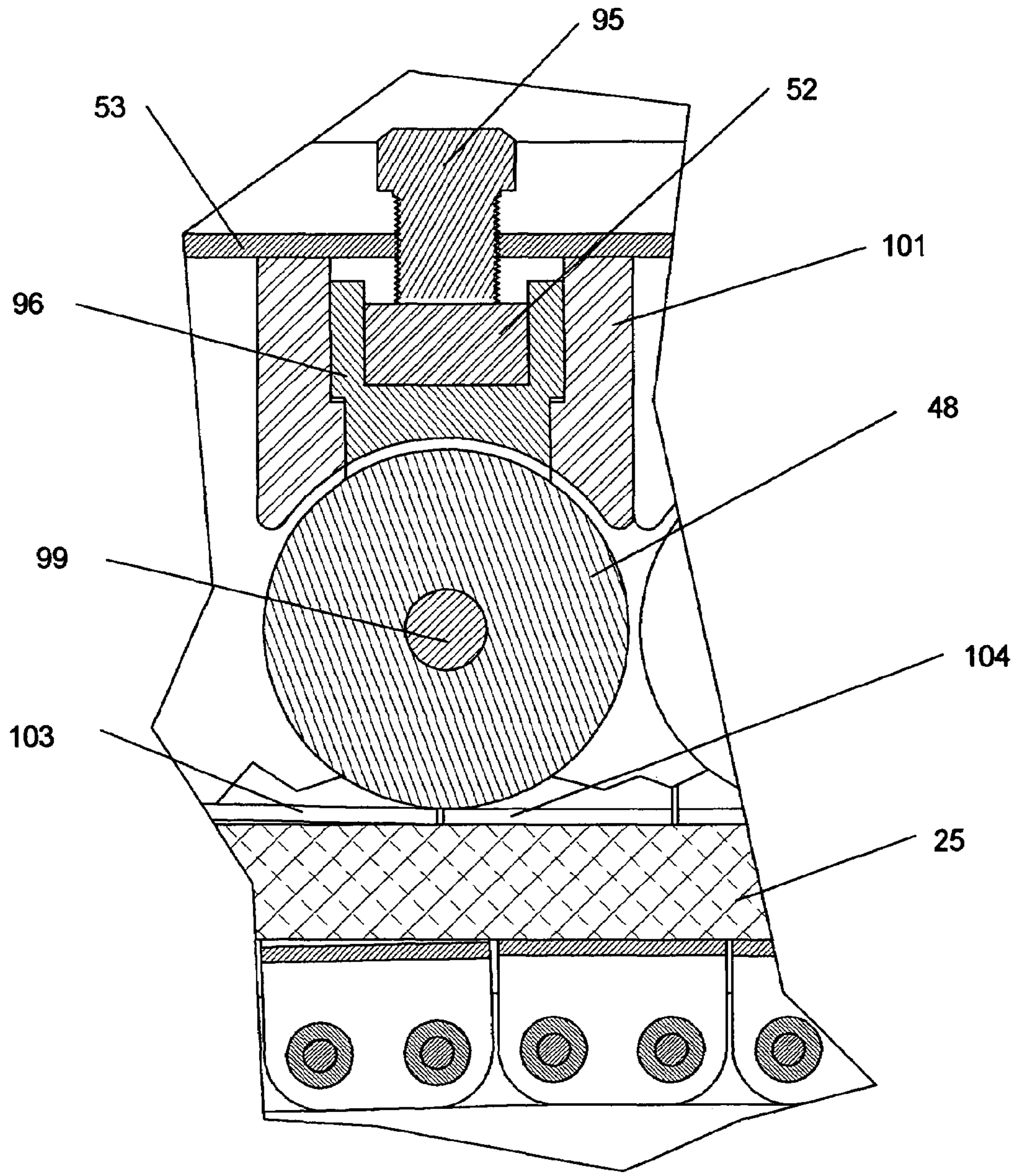
FIG. 12 is an enlargement of the Row 1 pressure roller from FIG. 3

FIG. 12 is an enlargement of the Row 1 pressure roller 48 from FIG. 3. Note the step on the pressure roller collar 101 that limits the travel of the collar for roller 96 toward the cable 25. Before a cable 25 is fed into the cable traction apparatus, this travel limit step keeps the pressure roller 48 properly positioned. This position would allow a smaller diameter pilot cable to freely move and also would then adjust out the slight amount needed when the correct cable 25 was fed into the cable traction apparatus.

Note the position of cable links 103 and 104 relative to the pressure roller 48. The pressure roller 48 at this position potentially would be exerting an excessive stress on the cable 25. Cable links 103 and 104 would pivot slightly due to the high force and the end edge of the cable links would potentially damage the cable 25. The next figure will outline how an adjacent cable link prevents this potential denting damage to the cable 25.

Figure 13:
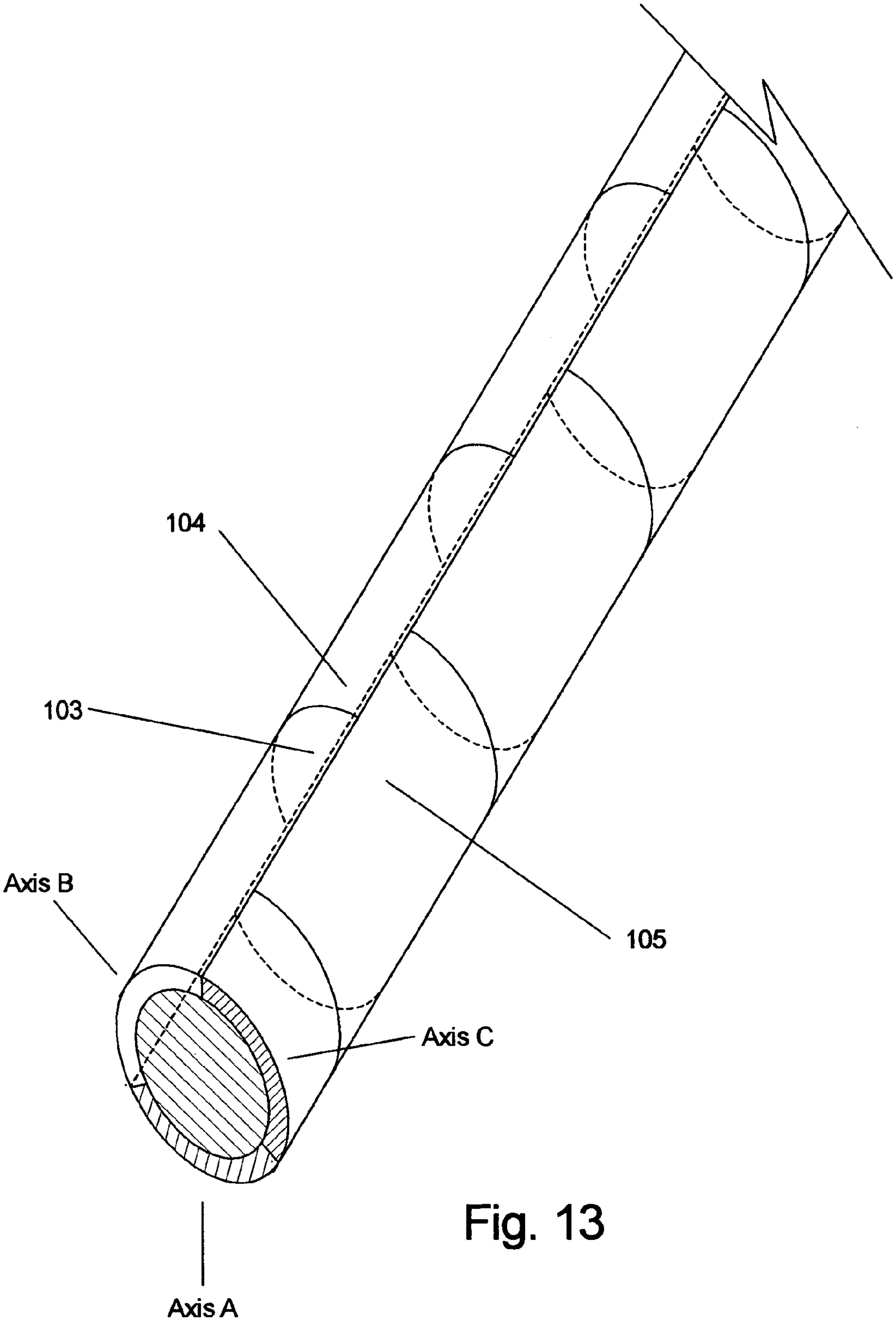
FIG. 13 is an isometric schematic view of the cable and links

FIG. 13 is an isometric schematic view of the cable 25 and cable links. Cable links 103 and 104 are shown in a schematic manner with only the arcuate surface represented in the figure. The pressure roller 48 would be tracking along the line between cable links 103, 104 and 105. Note that at the moment the pressure roller 48 passes between pressure links 103 and 104, the roller is supported by cable link 105. The pressure roller 48 is always supported with a substantial cable link area. This allows a very high normal force to be imposed between the cable links and the cable 25 without damaging the cable 25.

Each row includes three pressure rollers (as shown in FIG. 10). In the theoretical ideal case, there would always be a cable link centered under each roller at all times. This ideal case would provide 100% of a link area for each roller at all times. Moving to the realistic dynamic case of the present invention, the cable links must move to provide the linear motion. As each cable link joint moves under a pressure roller, the cable link effectively provides no support for the pressure roller. The two cable links at the joint are free to pivot on the roller chain. Therefore the full pressure of the roller must be supported by the cable link on the alternate axis which is not at a joint. If this cable link were centered under the pressure roller at this moment, the pressure roller would be supported by 50% of a link area.

There are two realistic requirements that further reduce this 50% target for cable link area. The mechanism operates more effectively with three rather than two axes. This requires that the cable links be staggered by ⅓, therefore the cable link is not centered under the pressure roller when the other axis is at a joint. Also, clearance must be provided between cable links. The apparatus as shown in FIG. 10 maintains a minimum pressure roller support of 10% of a link at all times.

Figure 14:
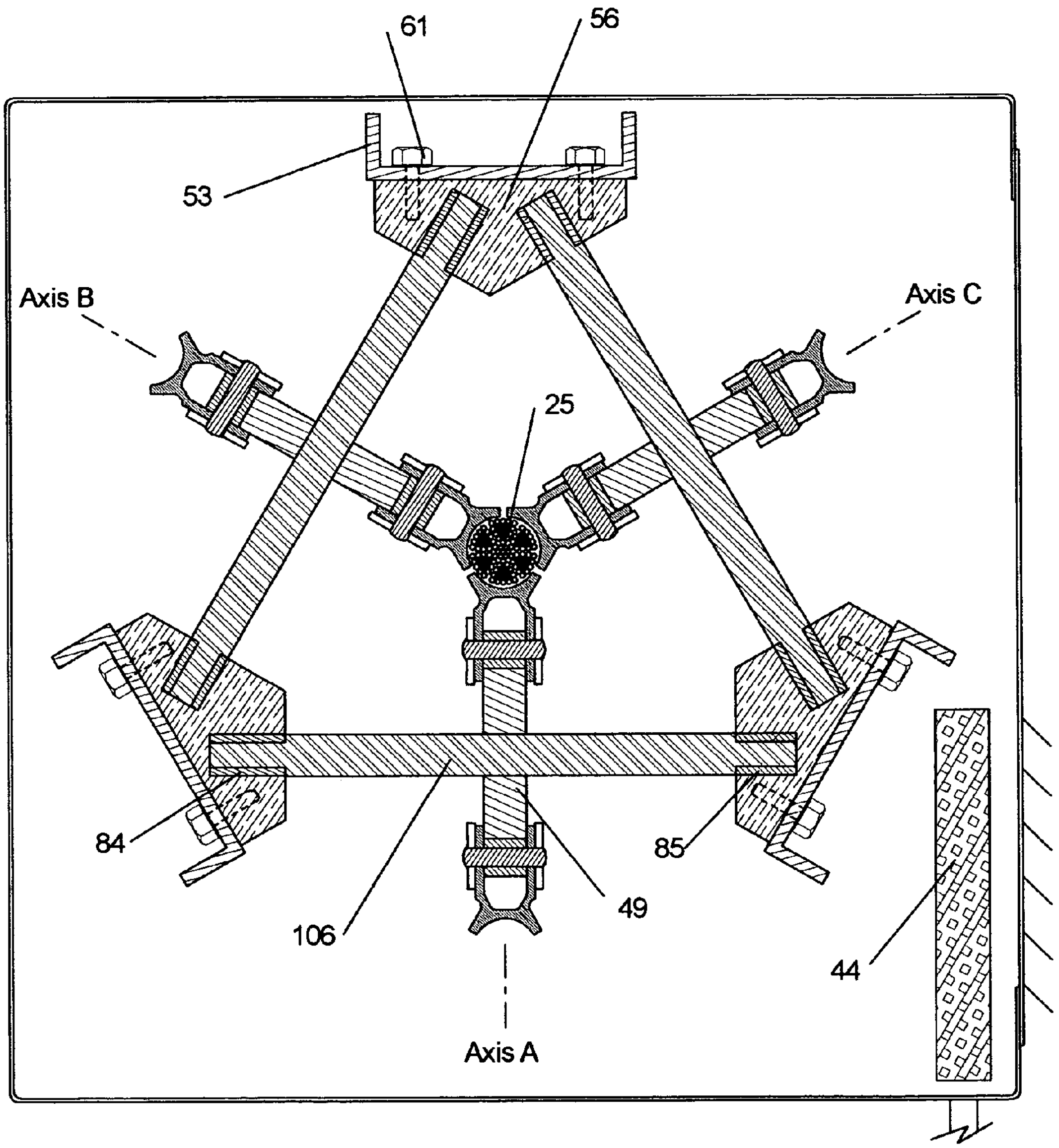
FIG. 14 is a section view of the cable chain idler—taken along section lines 14—14 from FIG. 1.

FIG. 14 is a section view of the cable chain idler—taken along section lines 14—14 from FIG. 1. The idler sprocket shaft 106 rotates in the inner sprocket shaft bearing 84 and the outer sprocket shaft bearing 85. The rear axle block 56 is attached to support channel A 53 via bolts 61. The chain idler sprocket 49 is press fit to the idler sprocket shaft 106.

Figure 15:
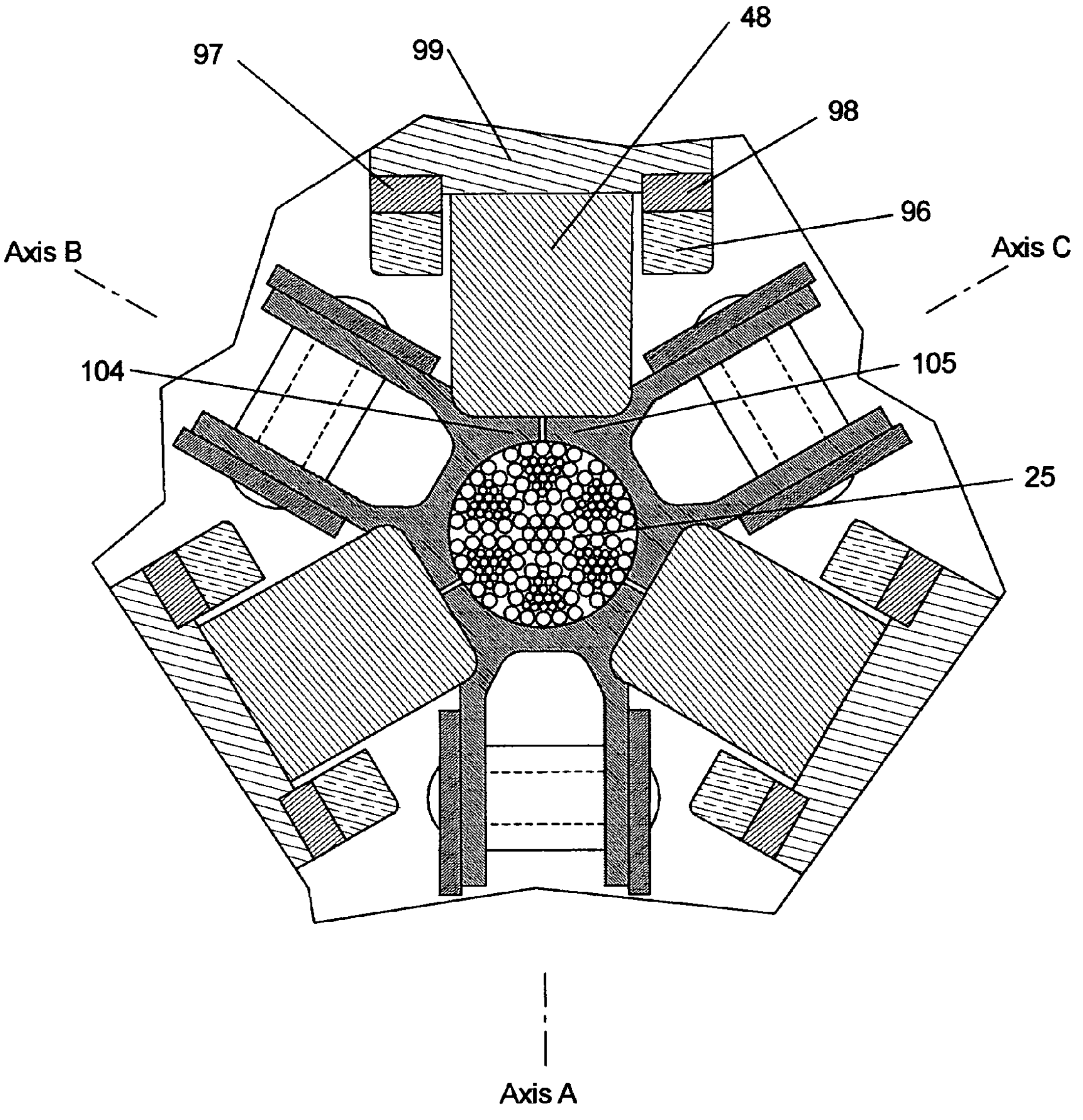
FIG. 15 is an enlargement of the cable, chain drive and pressure rollers from FIG. 10

FIG. 15 is an enlargement of the cable, chain drive and pressure rollers from FIG. 10. Note the slight gap along axis A between cable link 104 and cable link 105. These axis A, B and C gaps cause the pressure roller force to be applied to the cable 25.

Figure 16:
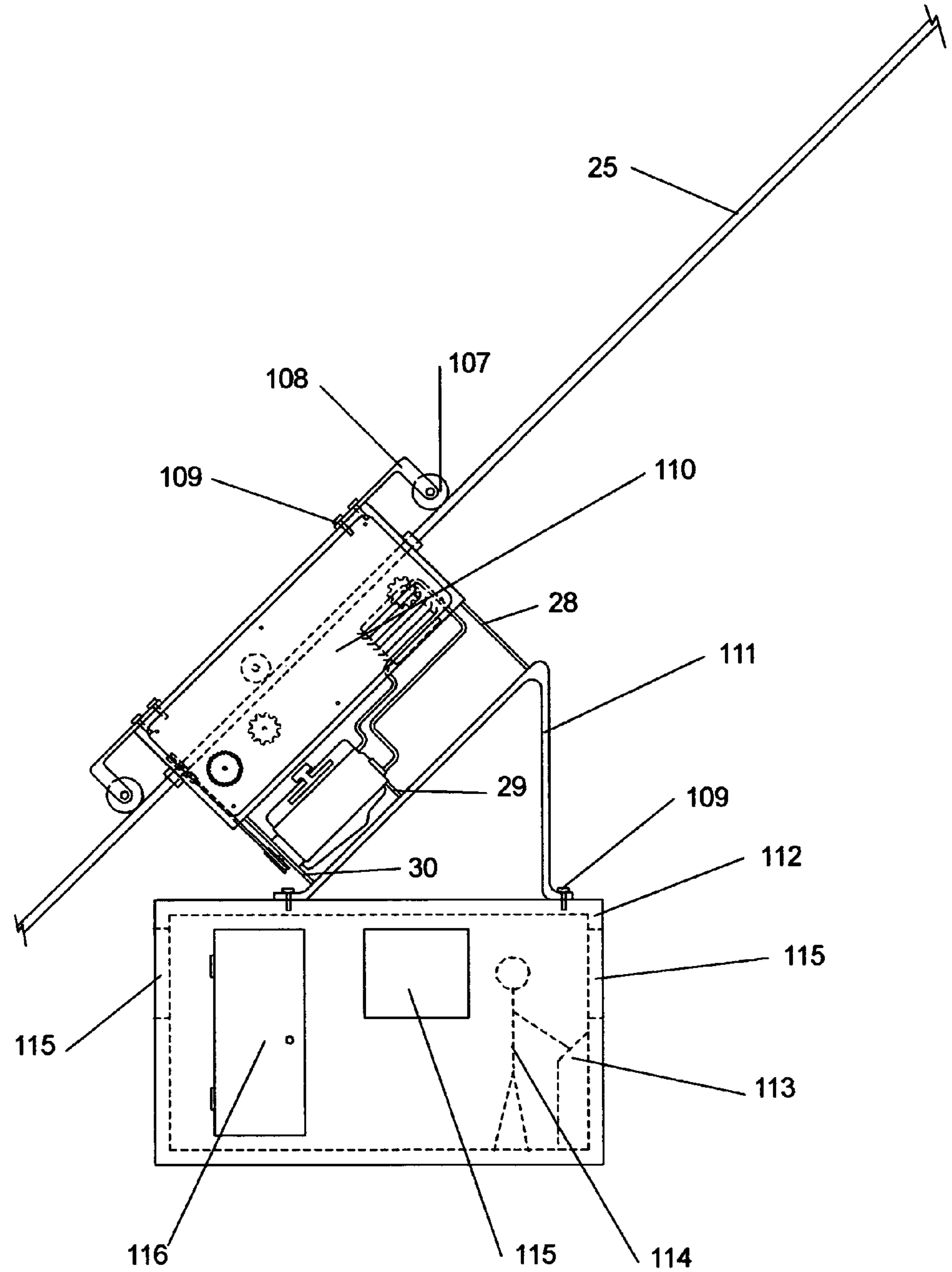
FIG. 16 is a side view of the cable traction apparatus attached to a container.

FIG. 16 is a side view of the cable traction apparatus attached to a container. The specific style of container shown is a gondola. The cable idler wheel 107 is affixed to the cable traction apparatus 110 via the idler wheel bracket 108 and bolts 109. The purpose of the cable idler wheels 107 is to align the cable 25 with the centerline axis of the cable traction apparatus 110. The gondola 112 is affixed to the cable traction apparatus 110 via the gondola bracket 111 and bolts 109. The rear support 28, engine rear support 29 and front support 30 are rigidly attached to the gondola bracket 111. The operator 113 controls the machine via the console 113. Egress to the gondola is achieved through the door 116 and windows 115 provide operator visibility. In this configuration the cable 25 is stationary and the cable traction apparatus 110 moves.

An operator 114 would not necessarily be required inside the container. The unit could be operated remotely or automatically. The container merely holds the payload that is desired to be transported up or down the cable 25.

In any event, the invention is only intended to be limited by the scope of the following claims.

I claim:

1. A traction apparatus comprising:

a. an elongate member with a longitudinal first axis;

b. a first friction surface which moves along a second axis, said second axis is substantially parallel to said first axis;

c. a second friction surface which moves along a third axis, said third axis is substantially parallel to and offset from said second axis;

d. means for driving said first friction surface;

e. said first friction surface and said second friction surface contact said elongate member; and f. a roller which applies force to said first friction surface and said second friction surface, wherein said roller is continuously supported.

2. The traction apparatus of claim 1 wherein said elongate member is a cable.

3. The traction apparatus of claim 2 wherein:

a. said first friction surface is a first continuous chain, and b. said second friction surface is a second continuous chain.

4. The traction apparatus of claim 3 wherein said roller is a plurality of rollers.

5. The traction apparatus of claim 1 wherein said means for driving includes a hollow center worm pinion, wherein said friction surfaces have synchronous motion.

6. The fraction apparatus of claim 3 wherein said roller is travel limited, said first continuous chain and said second continuous chain maintain a minimum opening distance, wherein an end of said cable feeds into said minimum opening distance.

7. The traction apparatus of claim 3 wherein first links of said first continuous chain and second links of said second continuous chain are staggered.

8. The fraction apparatus of claim 4 wherein said plurality of rollers are supported with a structural collar.

9. The traction apparatus of claim 7 wherein said roller is continuously supported against said cable by at least 10% of said first links or said second links.

10. The traction apparatus of claim 7 further comprising means for pushing said first links against said cable and allowing said first links to rotate without interfering with said cable.

11. A method of applying traction, the method comprising:

a. providing an elongate member with a longitudinal first axis;

b. moving a first friction surface along a second axis, said second axis is substantially parallel to said first axis;

c. moving a second friction surface along a third axis, said third axis is substantially parallel to and offset from said second axis;

d. driving said first friction surface; and e. applying force to said friction surfaces with a roller, resulting in continuous traction on said elongate member.

12. The method of claim 11, wherein said elongate member is a cable.

13. The method of claim 11, wherein:

a. said first friction surface is a looping chain, and b. said second friction surface is a second looping chain c. said friction surfaces are looping chains.

* * * * *

UNITED STATES PATENT AND TRADEMARK OFFICE

CERTIFICATE OF CORRECTION

PATENT NO. : 7,021,510 B2
APPLICATION NO. : 10/777555
DATED : April 4, 2006
INVENTOR(S) : David Irwin Ellingson It is certified that error appears in the above-identified patent and that said Letters Patent is hereby corrected as shown below:

Column 3, line 32, “FIG.” should be --FIG. 1.--

Column 10, line 27, “fraction” should be --traction--.

Column 10, line 35, “fraction” should be --traction--.

Signed and Sealed this

First Day of May, 2007

JON W. DUDAS
*Director of the United States Patent and Trademark Office*